Patented Oct. 31, 1922.

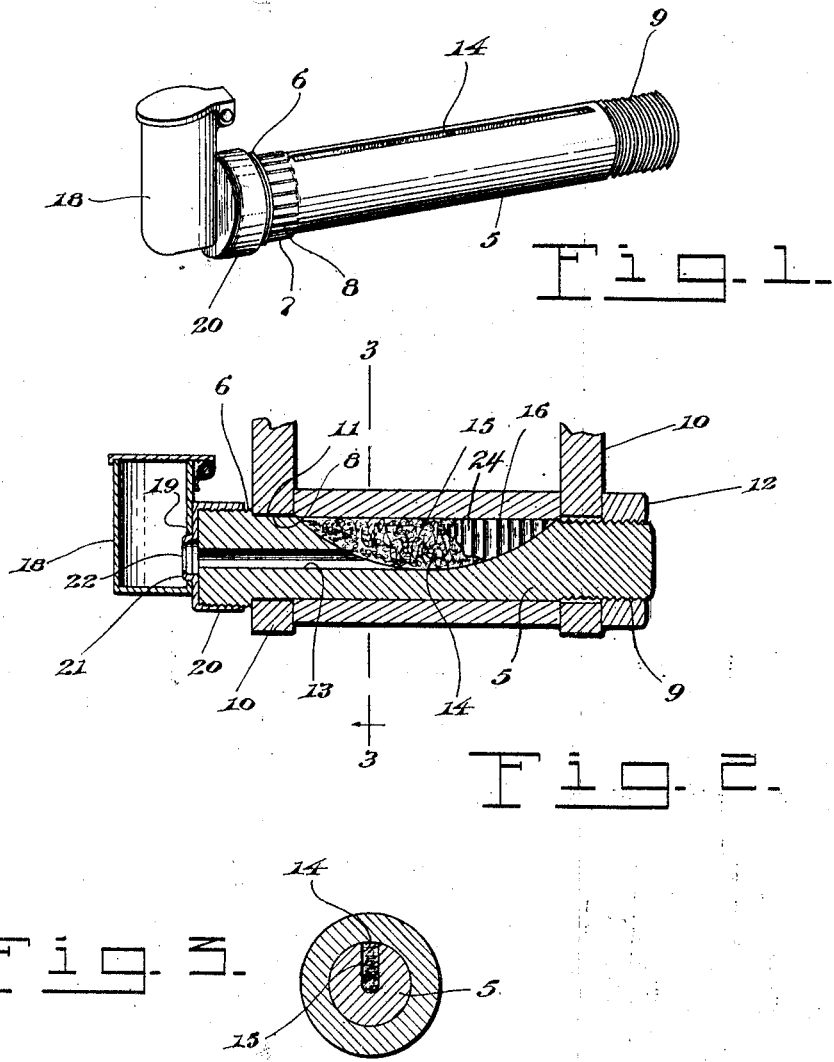

1,433,947

UNITED STATES PATENT OFFICE.

ALPHONS H. GITS, OF CHICAGO, ILLINOIS.

SHACKLE BOLT.

Application filed October 15, 1920, Serial No. 417,118. Renewed August 29, 1922. Serial No. 585,081.

*To all whom it may concern:*

Be it known that I, ALPHONS H. GITS, a citizen of the United States, residing at Chicago, in the county of Cook, State of Illinois, have invented certain new and useful Improvements in Shackle Bolts; and I do hereby declare the following to be a full, clear, and exact description of the invention, such as will enable others skilled in the art to which it appertains to make and use the same.

This invention relates to the lubrication of shackle bolts such as are employed in automobile constructions, it being the object of the invention to provide for lubricating with oil instead of with heavy grease.

In accomplishing the object, the head of the bolt is threaded on the outside instead of on the inside, which permits of the use of a small bolt without the long projecting head that is necessary for strength, when it is bored and tapped internally of the bolt to receive the usual grease cup. The present bolt is furthermore provided with a long longitudinal slot to accommodate a felt wick to lubricate throughout the length of the bearing eye while the side walls of this groove are channelled radially of the bolt to facilitate the feed of the oil.

The oil cup employed in connection with the bolt is provided with an internally threaded cap that screws onto the bolt head, the cap being separate from the body of the grease cup and having a perforated boss struck from its central portion and secured within the corresponding perforation in the side wall of the body, by brazing or otherwise, thus to carry the oil from the cup to the oil duct through the bolt head.

In the drawings:

Figure 1 is a perspective view showing a shackle bolt equipped with an oil cup, the entire structure embodying the present invention.

Figure 2 is a section taken vertically through a shackle bolt, a spring eye and a shackle and illustrating the arrangement of the present invention.

Figure 3 is a vertical section on line 3—3 of Figure 2, the plane of the section including the radial channels in the side walls of the wick holding groove.

Referring now to the drawings, the shackle bolt comprises a cylindrical body 5 having a slightly enlarged head 6 at one end which is externally threaded to receive the oil cup which will be presently explained. Directly adjacent the head 6, the body 5 is slightly enlarged as shown at 7, which portion has longitudinal ribs 8. The opposite extremity of the body is threaded as shown at 9.

In practice, a bolt of this type is employed at both the upper and the lower ends of the shackle plates, which are shown at 10, one of these plates having the walls of its perforations 11 channelled to receive the ribs 8 to hold the shackle bolts against rotation while the perforations of the other shackle plate are without such channels and have the threaded ends 9 of the bolts passed through them and beyond which the bolts are provided with the usual retaining nuts 12.

The shackle bolt is provided with an axial bore 13 that extends through the end face of the bolt head 6 and continues to near the opposite end of the body and communicating with this bore that constitutes an oil duct, is a groove 14 that extends longitudinally of the body from one shackle plate to the other and opens continuously through the periphery of the body 5.

Within the groove 14 is disposed a wick 15 of felt or other suitable material that terminates at the duct 13 so that if oil be forced into the duct, it will wet the wick over the extended longitudinal edge area and thus will feed efficiently to the outer edge portion of the wick and thence to the spring eye 16 or the horn eye 17 which lie between the shackle plates and through which the corresponding portion of the bolt body is snugly fitted.

To feed oil to the duct 13, there is employed an oil cup that comprises a usual body portion 18, in the side wall of which near to its bottom is formed a perforation 19. A metal cap 20 is internally threaded and provided for the externally threaded bolt head 6 and this cap has at its outer end a central boss 21 struck up or pressed from it and which boss is of a size to snugly fit in the perforation 19, the boss itself being centrally perforated as shown at 22 to permit of passage of oil from the body 18 into the cap and thence to the oil duct 13 with which the cap perforation registers.

The boss is forced into the perforation of the cap wall, where it is held by friction until it is firmly anchored and sealed by brazing.

To facilitate feeding of the oil, the side walls of the groove 14 may be channelled radially of the bolt as shown at 24, these channels permitting the oil to flow through them to initially wet the bolt, while the saturated wick maintains the body of oil in proper position for effective lubrication of the working faces of the bolt and eye.

What is claimed is:

1. A shackle bolt having a longitudinal groove through its eye receiving portion and a duct communicating with the groove and extending through an end of the bolt, the side walls of the groove having channels extending from the duct to the periphery of the bolt and a wick in the groove and exposed to the duct.

2. A shackle bolt having a longitudinal oil duct opening through an end and a longitudinal groove communicating with the duct and extending through the periphery of the eye receiving portion of the bolt, and means for supplying oil to the duct including a hollow body having an opening in its wall and a cap engaged upon the end of the bolt through which the duct passes and having at its outer end a central perforated boss engaged in the opening of said body wall.

3. A shackle bolt having a longitudinal oil duct opening through an end and a longitudinal groove communicating with the duct and extending through the periphery of the eye receiving portion of the bolt, and means for supplying oil to the duct including a hollow body having an opening in its wall and a cap engaged upon the end of the bolt through which the duct passes and having at its outer end a central perforated boss engaged in the opening of said body wall, and serving as the means for securing the body in place.

In testimony whereof, I affix my signature, in the presence of two witnesses.

ALPHONS H. GITS.

Witnesses:
EMILY LOVELL,
MARY ZAHRADNIK.